United States Patent [19]
Khare et al.

[11] Patent Number: 6,150,300
[45] Date of Patent: Nov. 21, 2000

[54] PROCESS TO PRODUCE SORBENTS

[75] Inventors: Gyanesh P. Khare, Bartlesville; Donald R. Engelbert, Copan, both of Okla.

[73] Assignee: Phillips Petroleum Company, Bartlesville, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,675

[22] Filed: Aug. 14, 1996

[51] Int. Cl.⁷ .................................................... B01J 20/10
[52] U.S. Cl. .......................... 502/407; 502/10; 502/412; 502/415
[58] Field of Search ................. 502/407, 9, 10, 502/406, 412, 415, 439

[56] References Cited

U.S. PATENT DOCUMENTS

| | | | |
|---|---|---|---|
| Re. 27,214 | 11/1971 | Nakahara et al. | 264/15 |
| 3,579,719 | 5/1971 | Moriya | 18/1 |
| 4,316,822 | 2/1982 | Fujitani et al. | 252/462 |
| 4,367,166 | 1/1983 | Fujitani et al. | 252/462 |
| 4,894,189 | 1/1990 | Dave et al. | 264/15 |
| 5,248,489 | 9/1993 | Kidd et al. | 423/220 |
| 5,281,445 | 1/1994 | Khare | 427/445 |
| 5,358,921 | 10/1994 | Kidd et al. | 502/407 |
| 5,387,740 | 2/1995 | Sasae et al. | 588/257 |
| 5,439,867 | 8/1995 | Khare et al. | 502/407 |

FOREIGN PATENT DOCUMENTS 1 517 713   10/1974   United Kingdom .

*Primary Examiner*—John F. Niebling
*Assistant Examiner*—Alexander G. Ghyka
*Attorney, Agent, or Firm*—Reece A. Scott

[57] ABSTRACT

A process to produce a sorbent is provided. This process comprises: mixing a composition that comprises silica, a composition that comprises metal oxide, and a composition that comprises zinc oxide, to form a first mixture; and sphering said first mixture to form particles having a diameter from about 10 micrometers to about 1000 micrometers.

97 Claims, No Drawings

PROCESS TO PRODUCE SORBENTS

This invention relates to the field of processes that produce sorbents. In particular, this invention relates to an improved process for producing a sorbent, which can be used in a fluidized bed, and which can be used to remove sulfur from a fluid stream.

The removal of sulfur from a fluid stream is desirable for a variety of reasons. If the fluid stream is to be released as a waste stream, removal of sulfur from the fluid stream can be necessary to meet the sulfur emission requirements. If the fluid stream is to be burned as a fuel, removal of sulfur from the fluid stream can be necessary to prevent environmental pollution. If the fluid stream is to be processed, removal of the sulfur is often necessary to prevent the poisoning of sulfur-sensitive catalysts.

Various sorbents have been used to remove sulfur from a fluid stream when the sulfur is present as hydrogen sulfide. These sorbents can be manufactured by a variety of methods, such as, extrusion. A problem that is often encountered in the production of these sorbents is equipment wear caused by the abrasive nature of the sorbents being manufactured. In certain attempts to produce commercial quantities of sorbents, excessive equipment wear and downtime, which is caused by the abrasive characteristics of the sorbent components, have rendered the production commercially of such sorbents less viable.

The use of fluidized beds have both advantages and disadvantages. Some advantages of fluidized beds are: continuous controlled operations; ease of handling; simple control; reliable operations; excellent heat transfer rates; and excellent mass transfer rates. Some disadvantages of fluidized beds are inefficient contacting of components and nonuniform residence times for components. However, despite these and other drawbacks, the economic advantages are compelling.

In order to use a sorbent in a fluidized bed, the sorbent needs to be highly resistant to attrition. That is, the sorbent needs to be resistant to degradation of its physical size and properties. Additionally, such sorbents need to be made in a relatively simple and economical process, so that its use is more viable.

Solutions to these problems are greatly needed. In particular, a simple, relativity inexpensive process, for the production of sorbents is greatly needed, so that commercial operations with such sorbents becomes more viable.

SUMMARY OF THE INVENTION

It is an object of this invention to provide a process to produce a sorbent.

It is also another object of this invention to provide a process to produce a sorbent that can be used in a fluidized bed.

In accordance with this invention a process to produce a sorbent is provided. This process comprises (or optionally: consists essentially of, or consists of): mixing a composition that comprises silica, a composition that comprises metal oxide, and a composition that comprises zinc oxide, to form a first mixture; and sphering said first mixture to form particles having a diameter from about 10 micrometers to about 1000 micrometers.

These and other objects of this invention will be apparent to those skilled in the art from the following detailed description of the invention and claims.

DETAILED DESCRIPTION OF THE INVENTION

The sorbent produced by this invention can be used to remove hydrogen sulfide from a fluid stream. The hydrogen sulfide can be produced by the hydrodesulfurization of organic sulfur compounds, or it can be originally present in the fluid stream as hydrogen sulfide. Examples of such fluid streams include: light hydrocarbons such as methane, ethane and natural gas; gases derived from petroleum products and products from extraction, gasification, and/or liquefaction of coal and lignite; gases derived from tar sands and shale oil; coal-derived synthesis gas; gases such as hydrogen and nitrogen; gaseous oxides of carbon; steam and the inert gases such as helium and argon. Additional information concerning the types of processes can be found in U.S. Pat. No. 5,281,445 (the entire disclosure of which is hereby incorporated by reference).

The sorbent produced by this invention comprises, in general, silica, metal oxide, and zinc oxide. The process to produce such sorbent comprises, in general, mixing silica, a metal oxide, and zinc oxide (ZnO) together to form a first mixture. These components (silica, metal oxide, and zinc oxide) can be mixed together simultaneously or sequentially. However, it is currently preferred to mix together the silica and the metal oxide to form an intermediate mixture followed by mixing this intermediate mixture with zinc oxide to form said first mixture.

The first mixture is then sphered to form particles having a diameter from about 10 micrometers to about 1000 micrometers. The first mixture can be sphered without it being extruded. This saves on the wear and tear of extrusion equipment because none need be used on the first mixture, nor should any be used on the first mixture. This sphering can be accomplished by adding the first mixture to a cylindrical container that has a rotating plate at the bottom (hereafter "bottom plate"). This bottom plate can be either flat or grooved, however, grooved is currently preferred. The rotation of the bottom plate converts the first mixture into spherical particles.

Equipment that can perform this sphering operation is available from various sources. Currently it is preferred to use a Marumerizer™ from the Luwa Corporation. Additional information concerning equipment of this nature can be found in U.S. Pat. Nos. 3,579,719; 4,316,822; 4,367,166; and 5,387,740.

After sphering the first mixture to obtain the spherical particles, these particles can be further processed by drying them to obtain dried particles. After drying, the dried particles can be further processed by calcining to obtain calcined particles. After calcining, the calcined particles can be contacted with a metal promoter to obtain promoted particles. After contacting, the promoted particles, can be further processed by drying to obtain dried, promoted particles. After drying, the dried, promoted particles can be further processed by calcining to obtain calcined, promoted particles.

Drying is conducted at a temperature from about 75° C. to about 300° C., more preferably, from 90° C. to 250° C., for a time period from about 0.5 hour to about 4 hours, more preferably, from 1 hour to 3 hours. Calcining is conducted, in the presence of oxygen, at a temperature from about 375° C. to about 750° C., more preferably, from 500° C. to 700° C., for a time period from about 0.5 hour to about 4 hours, more preferably, from 1 hour to 3 hours.

The silica used in this invention can be any suitable form of silicon dioxide ($SiO_2$). Silica, for the purposes of this invention includes both naturally occurring silica and synthetic silica. Currently, however, natural silica is preferred. Suitable examples of natural silicas are diatomaceous earth (which is also called kieselguhr, diatomite, infusorial earth, or celite) and clay. Suitable examples of clay include aluminum silicates, magnesium silicates, and aluminum-magnesium silicates. Suitable examples of aluminum silicates include bentonite, halloysite, kaolinite, montmorillonite, and pyrophylite. Suitable examples of magnesium silicates include hectorite, sepiolite, and talc. Suitable examples of aluminum-magnesium silicates include attapulgite and vermiculite. Suitable examples of synthetic silicas include zeolites, precipitated silicas, spray-dried silicas, and plasma-treated silicas. Mixtures of these silicas can also be used. Any commercially available silica can be used in this invention, however, diatomaceous earth is currently preferred.

The amount of silica present in the sorbent should be from about 10 weight percent to about 90 weight percent. Preferably, the amount of silica should be in the range of about 25 weight percent to 75 weight percent, and most preferably, the amount should be in the range of 35 weight percent to 55 weight percent, where these weight percents are based on the total weight of the sorbent.

Any suitable metal oxide can be used in this invention provided that it can be formed into colloidal-size particles and dispersed in an aqueous medium. This aqueous dispersion of the metal oxide can be referred to as a sol or a colloidal oxide solution. The colloid-size particles can range in size from less than one nanometer to greater than two micrometers. Colloid-size particles can be dispersed in an aqueous system by the addition of small quantities of acids such as hydrochloric acid, nitric acid, formic acid, or acetic acid. Typical solid concentrations of the colloidal oxide solutions can range from about 1 weight percent to about 30 weight percent solids where the weight percent of solids is based on the total weight of the colloidal oxide solution. The solution pH can range from about 2 to about 11 depending upon the method of preparation of the colloidal oxide solution. The colloidal oxide solution should comprise a metal oxide selected from the group consisting of aluminum oxide, silicon oxide, scandium oxide, titanium oxide, vanadium oxide, chromium oxide, manganese oxide, iron oxide, cobalt oxide, nickel oxide, copper oxide, gallium oxide, germanium oxide, yttrium oxide, zirconium oxide, niobium oxide, molybdenum oxide, technetium oxide, ruthenium oxide, rhodium oxide, palladium oxide, silver oxide, cadmium oxide, indium oxide, tin oxide, antimony oxide, lanthanum oxide, hafnium oxide, tantalum oxide, tungsten oxide, rhenium oxide, osmium oxide, iridium oxide, platinum oxide, gold oxide, mercury oxide, thallium oxide, lead oxide, bismuth oxide, and cerium oxide. Currently, preferred are aluminum oxide, silicon oxide, zirconium oxide, tin oxide, antimony oxide, cerium oxide, yttrium oxide, copper oxide, iron oxide, manganese oxide, molybdenum oxide, tungsten oxide, chromium oxide and mixtures of any two or more thereof. It is presently even more preferred that the colloidal oxide solution be either a colloidal aluminum oxide solution or a colloidal silicon oxide solution.

Generally, any suitable quantity of colloidal oxide solution can be mixed with the silica. It is preferred, however, to use an amount of colloidal oxide solution that will give a metal oxide concentration in the sorbent in the range of from about 1 weight percent to about 15 weight percent where the weight percents are based on the total weight of the sorbent.

The zinc oxide used in the preparation of the sorbent can be either in the form of zinc oxide, or in the form of zinc compounds that are convertible to zinc oxide under the conditions of preparation described herein. Examples of such zinc compounds include zinc sulfide, zinc sulfate, zinc hydroxide, zinc carbonate, zinc acetate, zinc nitrate and mixtures of any two or more thereof. Preferably, the zinc oxide is in the form of powdered zinc oxide. The zinc oxide will generally be present in the sorbent in an amount in the range of from about 10 weight percent to about 90 weight percent, and will more preferably be in the range of from 20 weight percent to 80 weight percent, and will most preferably be in the range of from 40 weight percent to 70 weight percent based on the weight of the sorbent.

It is preferred to mix the silica with a metal oxide prior to it being mixed with zinc oxide. The mixing can be performed by any suitable method known in the art. Suitable examples of such methods include, but are not limited to, standard incipient wetness impregnation, wet impregnation, spray drying, chemical vapor deposition, and plasma spray deposition. It is preferred, however, to use a spray impregnation technique whereby the silica material is contacted with a spray of a colloidal oxide solution, wherein the solution has the desired amount of colloidal oxide material dissolved in a sufficient volume of water to fill the total pore volume of the silica or, in other words, to effect an incipient wetness impregnation of the silica.

Once the silica and the colloidal oxide solution are mixed to form the intermediate mixture, this intermediate mixture is then mixed with zinc oxide powder to form the first mixture. The mixing of these materials can be performed by any suitable method. Suitable examples of the types of mixing devices include, but are not limited to, tumblers, stationary shells, muller mixers, and impact mixers. It is currently preferred to use a muller mixer in the mixing of the silica, metal oxide, and zinc oxide.

The sorbent can further comprise metal promoters selected from groups 6 through 11 of the periodic table (see Hawley's Condensed Chemical Dictionary, 11th edition, inside front cover IUPAC nomenclature). Examples of these metal promoters are chromium, molybdenum, tungsten, manganese, technetium, rhenium, iron, ruthenium, osmium, cobalt, rhodium, iridium, nickel, palladium, platinum, copper, silver, and gold. Currently, a preferred metal promoter is nickel. Mixtures of these metal promoters can also be used.

The metal promoter can be added to the sorbent in the form of an elemental metal and/or a metal-containing compound, which is convertible to a metal oxide under the calcining conditions described herein. Some examples of such metal-containing compounds include metal acetates, metal carbonates, metal nitrates, metal sulfates, metal thiocyanates, and mixtures of any two or more thereof.

The elemental metal and/or metal-containing compound can be contacted with the sorbent by any method known in the art. One such method is the impregnation of the sorbent with a solution, either aqueous or organic, that contains the elemental metal and/or metal-containing compound. After the elemental metal and/or metal-containing compound have been contacted with the sorbent, the promoted sorbent is dried and calcined, as herein described.

It should be noted that the elemental metal and/or metal-containing compound can also be mixed with the silica, metal oxide, and zinc oxide to form the first mixture, thereby simplifying the production process.

The metal promoter will generally be present in the sorbent in an amount in the range of from about 0.1 weight percent to about 30 weight percent, and will more preferably be in the range of from 2.0 weight percent to about 15 weight percent based on the weight of the sorbent.

The following examples are presented in further illustration of the invention.

COMPARATIVE EXAMPLES

These comparative examples demonstrate that the compositions described in U.S. Pat. No. 4,367,166, col. 3, lines 49–59 will not make spherical particles in a Marumerizer™ in the absence of prior extrusion.

Mixed in a Sigma mixer for 10 minutes were 560 grams of alumina (DISPAL® 180, average particle size of 40 micrometers (400,000 angstroms) available from the Vista Chemical Company), 200 grams of magnesium oxide (MAGOX® 98 Premium calcined magnesite, available from Premier Services Corporation) and 7.6 grams of dextrin (available from Sigma Chemical Company). The mixture was then added to a Marumerizer™ using a 5 mm groove plate at 300 rpm. All material either dusted out the top or passed by the groove plate into the dust collector. No spheres were formed. The material stayed the same mesh size as originally fed to the Marumerizer™.

Likewise, 70 grams of alumina (Aluminum Oxide C, average primary particle size of 0.02 micrometers (200 angstroms) available from Degussa), 25 grams of magnesium oxide (MAGOX® 98 Premium calcined magnesite, available from Premier Services Corporation) and 0.95 gram of dextrin (available from Sigma Chemical Company) were mixed in a Sigma mixer for 10 minutes. This mixture was then added to a Marumerizer™ using a 5 mm groove plate at 300 rpm. All material either dusted out the top or passed by the groove plate into the dust collector. No spheres were formed. The material stayed the same mesh size as originally fed to the Marumerizer™.

INVENTIVE EXAMPLE

This example demonstrates a composition that can be converted into spherical particles using a Marumerizer™ without having to first extrude said composition. This example further demonstrates that such spherical particles exhibit sufficient attrition resistance and sulfur removing capacity to function effectively in a fluidized bed to remove hydrogen sulfide from a fluid stream containing such hydrogen sulfide.

Diatomite powder (Celite Filter Cel, available from Celite Corporation, 2.5 micrometer median particle size) was mixed in a mixing bowl to incipient wetness using Nyacol Al-20 colloidal alumina solution (available from PQ Corporation, 500 Angstrom particle size) in an amount sufficient that the final formulation contained 12 weight percent alumina. This composition was then mixed with a calculated amount of dry zinc oxide powder to yield approximately 50 weight percent zinc oxide in the resulting product. The product was then added slowly to a Marumerizer™ using a 5 mm groove plate at 600–1200 rpm. A residence time of about one minute was required to form spherical particles having a particle diameter from 50 to 500 micrometers (500,000 to 5,000,000 Angstroms). These spherical particles were then dried, in air, at 150° C. for 3 hours, and then calcined, in air, at 635° C. for 1 hour. Screen analysis indicated that about 90 weight percent of the spherical particles were in the 50 to 500 micrometer size range (about 6 percent were less than 50 micrometers and about 4 percent were greater than 500 micrometers). The bulk density of the particles was 1.19 grams per cubic centimeter.

One hundred grams of this material was spray impregnated with a solution of 29.71 grams of nickel(II) nitrate hexahydrate dissolved in 31.2 grams of deionized water. The impregnated material was dried, in air, at 150° C. for 1 hour and then calcined, in air, at 635° C. for 1 hour, ramping from ambient at 5° C. per minute during the calcination. The resulting sorbent was tested for attrition resistance, for 5 hours, using the procedure disclosed in U.S. Pat. No. 4,010,116 (the entire disclosure of which is hereby incorporated by reference). The sorbent exhibited an attrition of 5.08 percent while that of the control (Davison GXP-5 fluidized catalytic cracking catalyst) was 4.59 percent. This indicates the sorbent has sufficient attrition resistance to function acceptably in a fluidized system.

This sorbent was subjected to a standard sorption test in which the sorbent was alternately contacted with gaseous streams containing either hydrogen sulfide mixed with inert gases such as carbon dioxide and nitrogen, or air to regenerate the sulfur-laden sorbent. The reactor temperatures for the two steps were 426.7° C. and 593.3° C., respectively. The sulfur loading on the sorbent was determined to be complete when hydrogen sulfide was detected at 100 ppm in the effluent stream. At that point, the sulfided material was regenerated in air. A more detailed description of the testing procedure is disclosed in U.S. Pat. No. 5,306,685 (the disclosure of which is hereby incorporated by reference). The data for twenty cycles of testing, shown in Table 1, clearly show the sorbent, quite unexpectedly to be highly effective in sulfur removal.

TABLE 1

| SULFUR REMOVAL TEST RESULTS | |
|---|---|
| CYCLE | % SULFUR PICKUP |
| 1 | 14.6 |
| 5 | 14.4 |
| 10 | 14.3 |
| 15 | 13.6 |
| 20 | 13.1 |

Reasonable variations and modifications are possible within the scope of this disclosure without departing from the scope and spirit thereof.

That which is claimed is:

1. A process to produce a sorbent said process comprising producing spherical particles wherein said spherical particles are produced by the process consisting essentially of:
   (a) mixing
      (1) a composition that comprises silica,
      (2) a composition that comprises metal oxide dispersed in an aqueous medium, and
      (3) a composition that comprises zinc oxide to form a first mixture and then, without said first mixture being extruded;
   (b) sphering said first mixture to form particles having a diameter from about 10 micrometers to about 1000 micrometers.

2. A process according to claim 1 wherein said composition that comprises silica comprises a natural silica selected from the group consisting of diatomaceous earth, clay, and mixtures thereof.

3. A process according to claim 2 wherein said clay comprises aluminum silicate, magnesium silicate, or aluminum-magnesium silicate.

4. A process according to claim 2 wherein said clay comprises an aluminum silicate selected from the group consisting of bentonite, halloysite, kaolinite, montmorillonite, pyrophylite, or mixtures thereof.

5. A process according to claim 2 wherein said clay comprises a magnesium silicate selected from the group consisting of hectorite, sepiolite, talc and mixtures thereof.

6. A process according to claim 2 wherein said clay comprises an aluminum-magnesium silicate selected from the group consisting of attapulgite, vermiculite and mixtures thereof.

7. A process according to claim 1 wherein said composition that comprises silica comprises diatomaceous earth.

8. A process according to claim 7 wherein the amount of silica present in said sorbent is from about 10 weight percent to about 90 weight percent.

9. A process according to claim 7 wherein the amount of silica present in said sorbent is from about 25 weight percent to 75 weight percent.

10. A process according to claim 7 wherein the amount of silica present in said sorbent is from 35 weight percent to 55 weight percent.

11. A process according to claim 2 wherein said composition that comprises metal oxide comprises a metal oxide is selected from the group consisting of aluminum oxide, silicon oxide, scandium oxide, titanium oxide, vanadium oxide, chromium oxide, manganese oxide, iron oxide, cobalt oxide, nickel oxide, copper oxide, gallium oxide, germanium oxide, yttrium oxide, zirconium oxide, niobium oxide, molybdenum oxide, technetium oxide, ruthenium oxide, rhodium oxide, palladium oxide, silver oxide, cadmium oxide, indium oxide, tin oxide, antimony oxide, lanthanum oxide, hafnium oxide, tantalum oxide, tungsten oxide, rhenium oxide, osmium oxide, iridium oxide, platinum oxide, gold oxide, mercury oxide, thallium oxide, lead oxide, bismuth oxide, cerium oxide, and mixtures thereof.

12. A process according to claim 2 wherein said composition that comprises metal oxide comprises a metal oxide is selected from the group consisting of aluminum oxide, silicon oxide, zirconium oxide, tin oxide, antimony oxide, cerium oxide, yttrium oxide, copper oxide, iron oxide, manganese oxide, molybdenum oxide, tungsten oxide, chromium oxide and mixtures of any two or more thereof.

13. A process according to claim 2 wherein said composition that comprises metal oxide comprises a metal oxide is selected from the group consisting of aluminum oxide and silicon oxide.

14. A process according to claim 1 wherein said process to produce a sorbent further comprises drying said spherical particles at a temperature from about 75° C. to about 300° C. for a time period from about 0.5 hours to about 4 hours to obtain dried particles.

15. A process according to claim 14 wherein said process to produce a sorbent further comprises calcining said dried particles at a temperature from about 375° C. to about 750° C. for a time period from about 0.5 hours to about 4 hours to obtain calcined particles.

16. A process according to claim 1 wherein step (a) further consists essentially of mixing with a metal promoter.

17. A process according to claim 1 wherein step (a) further consisting essentially of mixing with a metal promoter selected from the group consisting of chromium, molybdenum, tungsten, manganese, technetium, rhenium, iron, ruthenium, osmium, cobalt, rhodium, iridium, nickel, palladium, platinum, copper, silver, gold and mixtures thereof.

18. A process according to claim 1 wherein step (a) further consisting essentially of mixing with a metal promoter that comprises nickel.

19. A process to produce a sorbent said process comprising
(a) producing spherical particles wherein said spherical particles are produced by the process consisting essentially of: mixing
(1) a composition that comprises diatomaceous earth,
(2) a composition that comprises aluminum oxide dispersed in an aqueous medium, and
(3) a composition that comprises zinc oxide to form a first mixture and then, without said first mixture being extruded sphering said first mixture to form particles having a diameter from about 10 micrometers to about 1000 micrometers;
(b) drying said particles at a temperature from about 75° C. to about 300° C. for a time period from about 0.5 hours to about 4 hours to obtain dried particles; and
(c) calcining said dried particles at a temperature from about 375° C. to about 750° C. for a time period from about 0.5 hours to about 4 hours to obtain calcined particles.

20. A process to produce a sorbent said process comprising
(a) producing spherical particles wherein said spherical particles are produced by the process consisting essentially of: mixing
(1) a composition that comprises diatomaceous earth,
(2) a composition that comprises aluminum oxide dispersed in an aqueous medium,
(3) a composition that comprises zinc oxide, and
(4) a composition that comprises nickel to form a first mixture and then, without said first mixture being extruded sphering said first mixture to form particles having a diameter from about 10 micrometers to about 1000 micrometers;
(b) drying said particles at a temperature from about 75° C. to about 300° C. for a time period from about 0.5 hours to about 4 hours to obtain dried particles; and
(c) calcining said dried particles at a temperature from about 375° C. to about 750° C. for a time period from about 0.5 hours to about 4 hours to obtain calcined particles.

21. A process according to claim 19 wherein the amount of diatomaceous earth present in said sorbent is from about 10 weight percent to about 90 weight percent.

22. A process according to claim 19 wherein the amount of diatomaceous earth present in said sorbent is from about 25 weight percent to 75 weight percent.

23. A process according to claim 19 wherein the amount of diatomaceous earth present in said sorbent is from 35 weight percent to 55 weight percent.

24. A process according to claim 20 wherein the amount of diatomaceous earth present in said sorbent is from about 10 weight percent to about 90 weight percent.

25. A process according to claim 20 wherein the amount of diatomaceous earth present in said sorbent is from about 25 weight percent to 75 weight percent.

26. A process according to claim 20 wherein the amount of diatomaceous earth present in said sorbent is from 35 weight percent to 55 weight percent.

27. A process according to claim 1 wherein said aqueous medium further comprises an acid.

28. A process according to claim 27 wherein said acid is selected from the group consisting of hydrochloric acid, nitric acid, formic acid, acetic acid, and combinations thereof.

29. A process according to claim 28 wherein said acid is acetic acid.

30. A process according to claim 1 wherein said metal oxide is in the form of colloidal-size particles ranging in size from about one nanometer to about two micrometers.

31. A process according to claim 19 wherein said aqueous medium further comprises an acid.

32. A process according to claim 31 wherein said acid is selected from the group consisting of hydrochloric acid, nitric acid, formic acid, acetic acid, and combinations thereof.

33. A process according to claim 32 wherein said acid is acetic acid.

34. A process according to claim 19 wherein said aluminum oxide is in the form of colloidal-size particles ranging in size from about one nanometer to about two micrometers.

35. A process according to claim 20 wherein said aqueous medium further comprises an acid.

36. A process according to claim 35 wherein said acid is selected from the group consisting of hydrochloric acid, nitric acid, formic acid, acetic acid, and combinations thereof.

37. A process according to claim 36 wherein said acid is acetic acid.

38. A process according to claim 20 wherein said aluminum oxide is in the form of colloidal-size particles ranging in size from about one nanometer to about two micrometers.

39. A process to produce a sorbent said process comprising producing spherical particles wherein said spherical particles are produced by the process consisting essentially of:
  (a) mixing
    (1) a composition that comprises silica and
    (2) a composition that comprises metal oxide to form an intermediate mixture, and
    (3) mixing said intermediate mixture with a composition that comprises zinc oxide to form a first mixture and then, without said first mixture being extruded;
  (b) sphering said first mixture to form particles having a diameter from about 10 micrometers to about 1000 micrometers.

40. A process according to claim 39 wherein said composition that comprises silica comprises a natural silica selected from the group consisting of diatomaceous earth, clay, and mixtures thereof.

41. A process according to claim 40 wherein said clay comprises aluminum silicate, magnesium silicate, or aluminum-magnesium silicate.

42. A process according to claim 40 wherein said clay comprises an aluminum silicate selected from the group consisting of bentonite, halloysite, kaolinite, montmorillonite, pyrophylite, or mixtures thereof.

43. A process according to claim 40 wherein said clay comprises a magnesium silicate selected from the group consisting of hectorite, sepiolite, talc and mixtures thereof.

44. A process according to claim 40 wherein said clay comprises an aluminum-magnesium silicate selected from the group consisting of attapulgite, vermiculite and mixtures thereof.

45. A process according to claim 39 wherein said composition that comprises silica comprises diatomaceous earth.

46. A process according to claim 39 wherein the amount of silica present in said sorbent is from about 10 weight percent to about 90 weight percent.

47. A process according to claim 46 wherein the amount of silica present in said sorbent is from about 25 weight percent to 75 weight percent.

48. A process according to claim 47 wherein the amount of silica present in said sorbent is from 35 weight percent to 55 weight percent.

49. A process according to claim 39 wherein said composition that comprises metal oxide comprises a metal oxide selected from the group consisting of aluminum oxide, silicon oxide, scandium oxide, titanium oxide, vanadium oxide, chromium oxide, manganese oxide, iron oxide, cobalt oxide, nickel oxide, copper oxide, gallium oxide, germanium oxide, yttrium oxide, zirconium oxide, niobium oxide, molybdenum oxide, technetium oxide, ruthenium oxide, rhodium oxide, palladium oxide, silver oxide, cadmium oxide, indium oxide, tin oxide, antimony oxide, lanthanum oxide, hafnium oxide, tantalum oxide, tungsten oxide, rhenium oxide, osmium oxide, iridium oxide, platinum oxide, gold oxide, mercury oxide, thallium oxide, lead oxide, bismuth oxide, cerium oxide, and mixtures thereof.

50. A process according to claim 49 wherein said composition that comprises metal oxide comprises a metal oxide selected from the group consisting of aluminum oxide, silicon oxide, zirconium oxide, tin oxide, antimony oxide, cerium oxide, yttrium oxide, copper oxide, iron oxide, manganese oxide, molybdenum oxide, tungsten oxide, chromium oxide and mixtures of any two or more thereof.

51. A process according to claim 50 wherein said composition that comprises metal oxide comprises a metal oxide selected from the group consisting of aluminum oxide and silicon oxide.

52. A process according to claim 39 wherein said process to produce a sorbent further comprises drying said spherical particles at a temperature from about 75° C. to about 300° C. for a time period from about 0.5 hours to about 4 hours to obtain dried particles.

53. A process according to claim 52 wherein said process to produce a sorbent further comprises calcining said dried particles at a temperature from about 375° C. to about 750° C. for a time period from about 0.5 hours to about 4 hours to obtain calcined particles.

54. A process according to claim 39 wherein step (a) further consists essentially of mixing with a metal promoter.

55. A process according to claim 39 wherein step (a) further consists essentially of mixing with a metal promoter selected from the group consisting of chromium, molybdenum, tungsten, manganese, technetium, rhenium, iron, ruthenium, osmium, cobalt, rhodium, iridium, nickel, palladium, platinum, copper, silver, gold and mixtures thereof.

56. A process according to claim 39 wherein step (a) further consists essentially of mixing with a metal promoter that comprises nickel.

57. A process according to claim 39 wherein said metal oxide is dispersed in an aqueous medium.

58. A process according to claim 57 wherein said aqueous medium further comprises an acid.

59. A process according to claim 58 wherein said acid is selected from the group consisting of hydrochloric acid, nitric acid, formic acid, acetic acid, and combinations thereof.

60. A process according to claim 59 wherein said acid is acetic acid.

61. A process according to claim 39 wherein said metal oxide is in the form of colloidal-size particles ranging in size from about one nanometer to about two micrometers.

62. A process to produce a sorbent said process comprising
  (a) producing spherical particles wherein said spherical particles are produced by the process consisting essentially of:
    mixing
    (1) a composition that comprises diatomaceous earth and
    (2) a composition that comprises aluminum oxide to form an intermediate mixture, and
    (3) mixing said intermediate mixture with a composition that comprises zinc oxide to form a first mixture and then, without said first mixture being extruded;

sphering said first mixture to form particles having a diameter from about 10 micrometers to about 1000 micrometers;

(b) drying said particles at a temperature from about 75° C. to about 300° C. for a time period from about 0.5 hours to about 4 hours to obtain dried particles; and (c) calcining said dried particles at a temperature from about 375° C. to about 750° C. for a time period from about 0.5 hours to about 4 hours to obtain calcined particles.

63. A process according to claim 62 wherein the amount of diatomaceous earth present in said sorbent is from about 10 weight percent to about 90 weight percent.

64. A process according to claim 63 wherein the amount of diatomaceous earth present in said sorbent is from about 25 weight percent to 75 weight percent.

65. A process according to claim 64 wherein the amount of diatomaceous earth present in said sorbent is from 35 weight percent to 55 weight percent.

66. A process to produce a sorbent said process comprising (a) producing spherical particles wherein said spherical particles are produced by the process consisting essentially of:
mixing
(1) a composition that comprises diatomaceous earth, and
(2) a composition that comprises aluminum oxide to form an intermediate mixture, and
(3) mixing said intermediate mixture with a composition that comprises zinc oxide and
(4) a composition that comprises nickel to form a first mixture and then, without said first mixture being extruded
sphering said first mixture to form particles having a diameter from about 10 micrometers to about 1000 micrometers;

(b) drying said particles at a temperature from about 75° C. to about 300° C. for a time period from about 0.5 hours to about 4 hours to obtain dried particles; and (c) calcining said dried particles at a temperature from about 375° C. to about 750° C. for a time period from about 0.5 hours to about 4 hours to obtain calcined particles.

67. A process according to claim 66 wherein the amount of diatomaceous earth present in said sorbent is from about 10 weight percent to about 90 weight percent.

68. A process according to claim 67 wherein the amount of diatomaceous earth present in said sorbent is from about 25 weight percent to 75 weight percent.

69. A process according to claim 68 wherein the amount of diatomaceous earth present in said sorbent is from 35 weight percent to 55 weight percent.

70. A process according to claim 62 wherein said aluminum oxide is dispersed in an aqueous medium.

71. A process according to claim 70 wherein said aqueous medium further comprises an acid.

72. A process according to claim 71 wherein said acid is selected from the group consisting of hydrochloric acid, nitric acid, formic acid, acetic acid, and combinations thereof.

73. A process according to claim 72 wherein said acid is acetic acid.

74. A process according to claim 62 wherein said aluminum oxide is in the form of colloidal-size particles ranging in size from about one nanometer to about two micrometers.

75. A process according to claim 66 wherein said aluminum oxide is dispersed in an aqueous medium.

76. A process according to claim 75 wherein said aqueous medium further comprises an acid.

77. A process according to claim 76 wherein said acid is selected from the group consisting of hydrochloric acid, nitric acid, formic acid, acetic acid, and combinations thereof.

78. A process according to claim 77 wherein said acid is acetic acid.

79. A process according to claim 66 wherein said aluminum oxide is in the form of colloidal-size particles ranging in size from about one nanometer to about two micrometers.

80. A process according to claim 1 wherein said sphering is conducted in a cylindrical container having a rotating plate at the bottom.

81. A process according to claim 80 wherein said rotating plate is rotating at a speed in the range of from about 600 to about 1200 rpm.

82. A process according to claim 81 wherein said sphering is conducted in a Marumerizer.

83. A process according to claim 19 wherein said sphering is conducted in a cylindrical container having a rotating plate at the bottom.

84. A process according to claim 83 wherein said rotating plate is rotating at a speed in the range of from about 600 to about 1200 rpm.

85. A process according to claim 84 wherein said sphering is conducted in a Marumerizer.

86. A process according to claim 20 wherein said sphering is conducted in a cylindrical container having a rotating plate at the bottom.

87. A process according to claim 86 wherein said rotating plate is rotating at a speed in the range of from about 600 to about 1200 rpm.

88. A process according to claim 87 wherein said sphering is conducted in a Marumerizer.

89. A process according to claim 39 wherein said sphering is conducted in a cylindrical container having a rotating plate at the bottom.

90. A process according to claim 89 wherein said rotating plate is rotating at a speed in the range of from about 600 to about 1200 rpm.

91. A process according to claim 90 wherein said sphering is conducted in a Marumerizer.

92. A process according to claim 62 wherein said sphering is conducted in a cylindrical container having a rotating plate at the bottom.

93. A process according to claim 92 wherein said rotating plate is rotating at a speed in the range of from about 600 to about 1200 rpm.

94. A process according to claim 93 wherein said sphering is conducted in a Marumerizer.

95. A process according to claim 66 wherein said sphering is conducted in a cylindrical container having a rotating plate at the bottom.

96. A process according to claim 95 wherein said rotating plate is rotating at a speed in the range of from about 600 to about 1200 rpm.

97. A process according to claim 96 wherein said sphering is conducted in a Marumerizer.

* * * * *